Aug. 30, 1960

E. L. BENNETT 2,950,763

JET DRIVEN ROTOR

Filed Nov. 22, 1955

INVENTOR.
EDWARD L. BENNETT

BY Fryer + Johnson

ATTORNEYS.

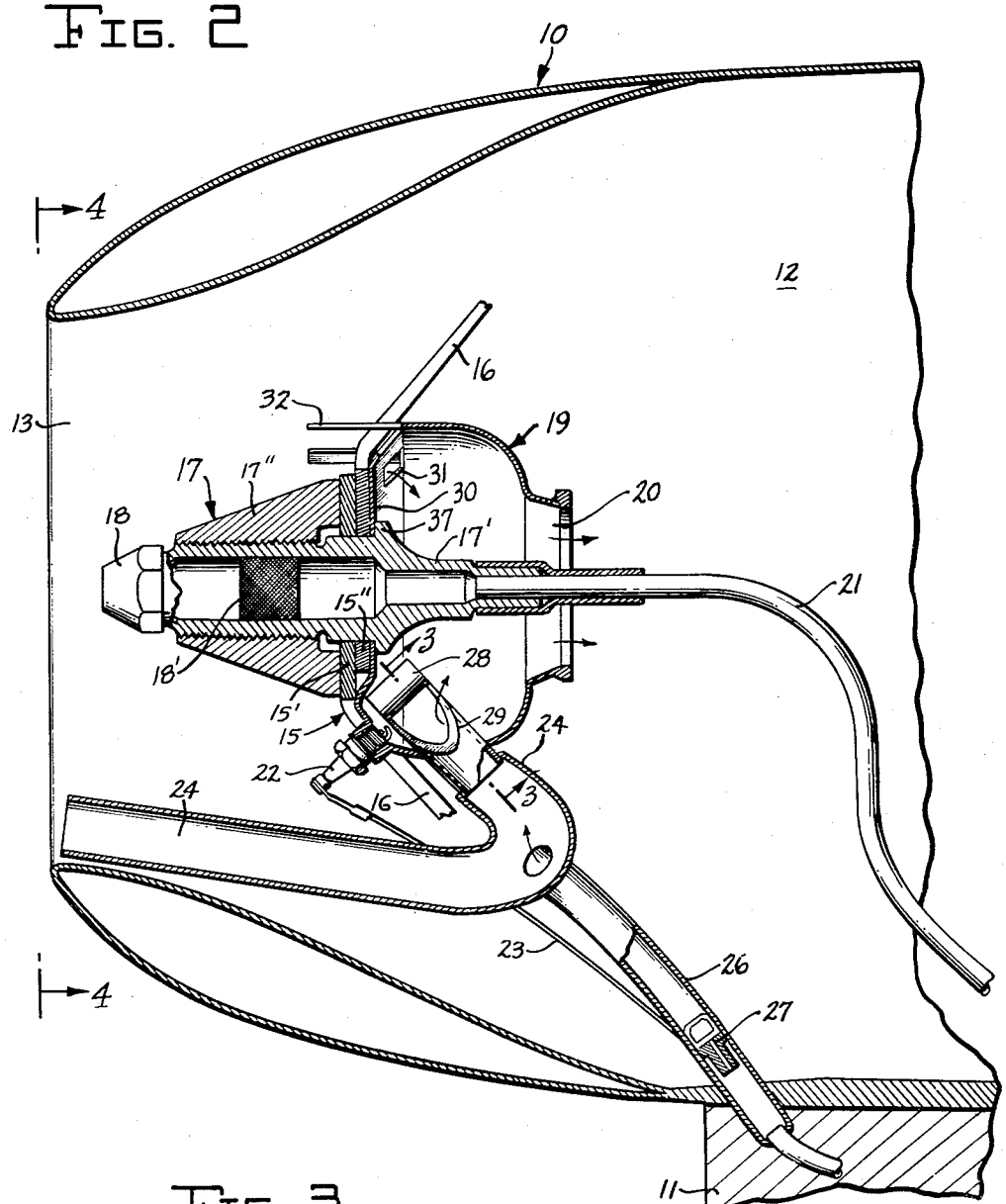
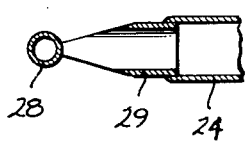
Fig. 2
Fig. 3

Aug. 30, 1960   E. L. BENNETT   2,950,763
JET DRIVEN ROTOR

Filed Nov. 22, 1955   3 Sheets-Sheet 3

INVENTOR.
EDWARD L. BENNETT
BY
Fryer + Johnson
ATTORNEYS

United States Patent Office 2,950,763
Patented Aug. 30, 1960

2,950,763

JET DRIVEN ROTOR

Edward L. Bennett, Palo Alto, Calif., assignor to Hiller Aircraft Corporation, Palo Alto, Calif., a corporation of California Filed Nov. 22, 1955, Ser. No. 548,423

6 Claims. (Cl. 170—135.4)

This invention relates generally to ram jet engines and particularly to means for use in starting such engines and as auxiliary continuous igniter means when such engines are in operation as when they are employed on a rotating part such as a helicopter blade.

This application is a continuation in part of co-pending application for United States Letters Patent entitled "Starting Means for Ram Jet Engines," filed September 29, 1953, Serial No. 382,996, now patent No. 2,795,283, dated June 11, 1957.

In said co-pending application, an engine is illustrated as having a somewhat tubular open-ended chamber or body with a forwardly directed upstream inlet opening and a rearwardly directed downstream discharge opening separated by an intermediate flame holder grid transversely disposed in the chamber intermediate the inlet and discharge openings as is conventional practice.

In the application referred to, start up ignition is facilitated by the provision of a relatively smaller enclosure or trap disposed in the main combustion chamber of the engine adjacent the rear of the flame holder grid and to which an independent fuel supply is initially directed to provide a static mass of fuel capable of being readily ignited by spark ignition means located in such trap, and combustion is supported by air entering through the forward end of the trap as it moves through the air.

Such a ram jet engine is started after it is in forward motion by energizing the spark ignition means in the enclosure to initiate combustion of fuel in the trap, and the resulting flame is directed through a reduced opening in the rear of the trap to in turn ignite the main air-fuel mixture in the engine. The primary or main fuel supply to such an engine is sprayed in front of the flame holder by means of a nozzle, the forward movement of the engine causing a flow of a primary air-fuel mixture backward through the flame holder grid into the main combustion chamber of the engine, a portion of such primary air-fuel mixture being continuously entrapped and combusted in such smaller trap thereby furnishing an auxiliary flame from combustion of a static air-fuel mass in such trap.

It is the object of the present invention to provide means for positively insuring ignition in the igniter trap on initial starting of a ram jet engine of the kind referred to or for restarting such engine in flight following periods of autorotation during which the engine is non-operative.

Another object is to provide an auxiliary or pilot jet in said trap that burns continuously during operation of the ram jet engine, thereby providing an independent secondary or auxiliary flame for automatically reigniting said engine in the event of an involuntary flame out.

A more specific object is to provide for positive delivery of secondary air or air-fuel mixture to the trap or enclosure independently of the primary air-fuel mixture supplied to the jet engine proper. Another specific object is to provide ways and means for initiating positive delivery of fuel to the enclosure prior to the delivery of any fuel to the main body of the jet engine.

A further specific object is to provide improved ways and means for supporting the flame holder grid as well as the primary fuel nozzle and auxiliary trap in such a ram jet engine to minimize strain on the engine due to thermal effects.

Further and more specific objects and advantages of the invention will become apparent from an understanding of the following specification, wherein one form of the invention is described in detail by reference to the accompanying drawings.

In the drawings:

Fig. 2 is an enlarged central horizontal sectional view of a forward portion of the ram jet engine illustrated in Fig. 1 showing details of the flame holder grid and the igniter trap provided by this invention, along with its associated secondary fuel and air supply means; the view is taken in a slightly different plane than in Fig. 1.

Fig. 3 is a section, taken in the plane of line 3—3 of Fig. 2, illustrating the structure of an air-fuel mixture distributor located in the igniter trap of Fig. 2;

Figure 1:
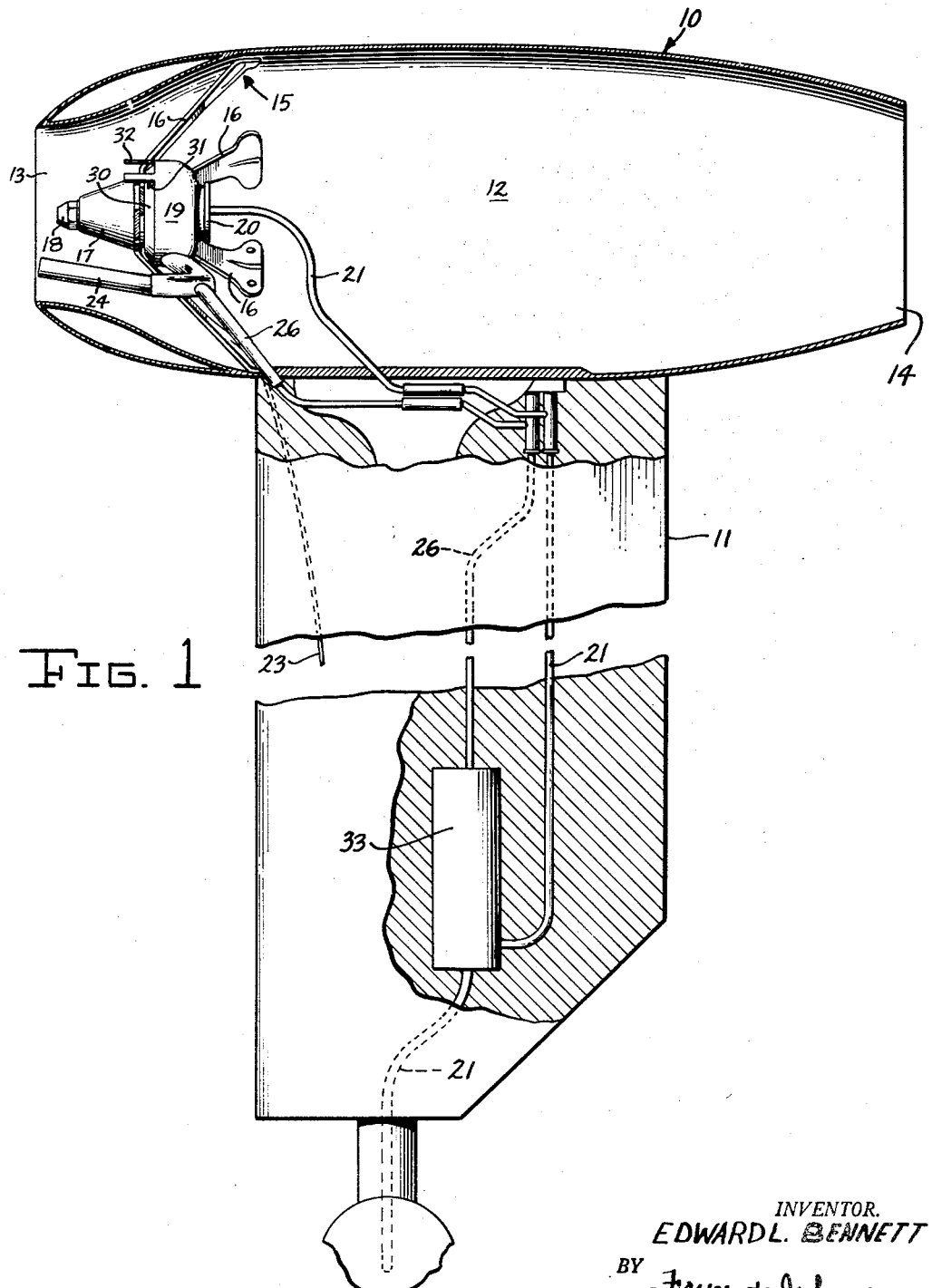
Fig. 1 is a horizontal sectional elevational view of a ram jet engine illustrated as mounted on the tip portion of a helicopter blade with the jet engine housing and some flame holder grid spokes shown in section to illustrate employment of the present invention therein; portions of the helicopter blade are cut away to show details of fuel supply means associated with the invention.

In the drawings, there is illustrated a ram jet engine 10 conventionally mounted on the tip or outer end of a standard rotor-mounted helicopter blade 11. The engine 10 comprises generally a tubular open ended chamber 12 having a forward upstream opening 13 and a rearward downstream 14. Disposed transversely in the tubular chamber 12 is a flame holder grid 15 having radially extending spokes 16 and on which is centrally located a two piece fuel hub assembly 17 which supports a primary fuel spray nozzle 18 and its fuel filter screen 18'. The spray nozzle is forwardly directed to spray or atomize primary fuel in the forward opening 13, which fuel combines with air to form a primary air-fuel mixture that flows back through openings between spokes 16 of the flame holder grid 15 into the combustion chamber 12 as the engine moves forward.

Located adjacent the rear face of the flame holder grid 15 is an auxiliary trap or enclosure 19 which has a rearwardly facing reduced cross sectional opening 20 to throttle flow of gases and provide a relatively static mass thereof and through which flames generated by combustion of fuel in the trap are directed. This trap 19 is held in position on the flame holder grid 15 by means of the fuel hub assembly 17 as will be hereinafter explained.

In the usual operation of a ram jet engine of the type described in the aforementioned application, fuel under pressure from a suitable pump, not shown, but which is usually located on the ship itself and driven in conventional manner by the rotor shaft (also not shown) about the axis of which the helicopter blade 11 rotates, is directed to the main spray nozzle 18 as by a conduit 21 suitably connected to the engine by conventional couplers. As the engine moves forwardly through the air, a portion of the air-fuel mixture formed in the forward opening 13 of the tubular chamber 12 is pocketed in the trap 19 and ignited by a spark plug or other spark creating device as indicated at 22. An electrical conductor through which the rod is energized is shown at 23 as leading through the blade 11 to a magneto, battery or other source of electrical energy located on the ship (not shown).

In the particular embodiment of the ram jet engine described in the aforementioned application, combustion of fuel in the trap is initiated by supplying to the trap an independent secondary fuel supply and igniting it there. After the engine has attained sufficient forward motion, such direct supply of fuel to the trap is automatically discontinued and further combustion in the trap is maintained by burning an air-fuel mixture formed adjacent the primary spray nozzle and passed into the trap through openings between spokes of the flame holder grid as the engine moves forward. In such aforementioned application, particular means are provided whereby, after a sufficient forward speed of the ram jet engine is attained to insure combustion of primary fuel in the main combustion chamber, the supply of secondary fuel to the trap is automatically terminated.

Thus, in the ram jet engine described in the aforementioned application, secondary fuel is initially supplied to the trap simultaneously with the initial supply of primary fuel to the main spray nozzle, but after combustion is initiated and forward motion of the engine reaches a predetermined speed, the secondary supply of fuel to the trap is cut off and thereafter all fuel is supplied to the engine through the primary spray nozzle.

The present invention also embodies a secondary supply of fuel to the trap, but in addition provides a continuously burning pilot flame or jet in the trap and to that end provides means to insure an initial supply of secondary fuel to the trap 19 with, or prior to, the initial supply of primary fuel to the primary fuel nozzle 18, and to automatically maintain a continuous supply of such secondary fuel to the trap during the entire period that the engine is in operation.

Additionally and importantly, the present invention provides means to insure a direct supply of secondary air or other combustion supporting gas to the trap in such a manner as to provide in such trap, adjacent its spark ignition means 22, secondary air-fuel mixture adapted to be efficiently combusted. This is accomplished by means of an air intake line 24 in direct communication with the trap 19 and which, in the embodiment shown, directs a confined stream of air from the forward part of the engine directly into the trap 19 where it is mixed with atomized secondary fuel supplied through a secondary fuel line 26 which is suitably connected to the trap through conventional couplers and in which is fitted a conventional spray nozzle 27.

As shown, the secondary fuel and air may advantageously be mixed in the secondary air intake line by directing incoming secondary fuel from the fuel line 26 into the air intake line 24 prior to its entry into the trap 19. Thus, an auxiliary or secondary air fuel mixture is supplied to the trap as a confined stream independent of and out of contact with, primary air-fuel mixture entering the main combustion chamber of the engine and into the trap through spaces between spokes 16.

To insure proper dispersal of the secondary air-fuel mixtures entering the trap 19 to aid in ignition and continued combustion therein, the trap is provided with dispersal means which, as shown in Figs. 2 and 3, comprises a baffle 28 mounted adjacent the open end of the extension 29 of the secondary air intake 24 inside the trap 19 and which deflects and disperses the incoming secondary air-fuel mixture.

It is to be noted that the zone in the trap 19 where dispersal and initial ignition of the secondary air-fuel mixture occurs is shielded from direct blasts of rearwardly flowing air; otherwise the air-fuel ratio may be upset thereby rendering ignition difficult. Moreover, at high speeds, such direct blasts of air may force the secondary air-fuel mixture to pass through the trap so rapidly as to blow out the pilot jet and render re-ignition impossible. In the embodiment shown, shielding is accomplished by means of a cover plate 30 covering the top or front end of the trap. This plate, which also serves as a means for supporting the trap as hereinafter explained, closes the forward end of the trap adjacent the zone wherein the secondary air-fuel mixture enters the trap for dispersion and ignition and so provides a shielded zone in which the secondary air-fuel mixture is relatively static and therefore readily ignited and combusted.

As a further aid in complete dispersal of the secondary air-fuel mixture, the trap cover-plate 30 is provided, on its outboard side opposite the ignition zone, with inlet ports 31 positioned in registration with openings between the flame holder grid spokes 16 and which, with the aid of forwardly extending scoop fingers 32, direct streams of primary air or air-fuel mixture from the forward upstream opening 13 of the engine into the section of the trap opposite the shielded ignition zone as the engine moves forward through the air. Such streams are deflected by the wall of the trap to create eddy currents which aid in combustion and dispersion of the air-fuel mixture in the trap. When the engine is in full operation, the air-fuel mixture entering through the ports 31 will comprise a small portion of the primary air-fuel mixture formed at the forward opening of the engine adjacent the main fuel nozzle 18, and this mixture which will be combusted in the trap along with the secondary air and fuel enhances ignition in the trap.

A continuous supply of secondary fuel to the trap 19 to maintain a continuously burning pilot flame or jet during operation of the engine may be provided by branching the secondary fuel line 26 directly from the primary fuel line 21 in any conventional manner to provide simultaneous and concomitant flow of both primary fuel to the main nozzle 18 and secondary fuel to the trap 19.

However, in some installations it may be desirable to initiate supply of secondary fuel to the trap 19 prior to initiating supply of primary fuel to the main spray nozzle 18 and also to continue the secondary fuel supply for a period should the flow of primary fuel to the spray nozzle 18 be halted for any reason. This will insure a pilot jet in the trap for initially igniting or reigniting the primary air-fuel supply. In the embodiment shown this is accomplished by means of a fuel accumulator 33 positioned in the main fuel line 21 at a position between the fuel pump (not shown) from which the fuel is supplied and the point at which the secondary fuel line 26 branches to supply fuel to the trap 19.

Figure 5:
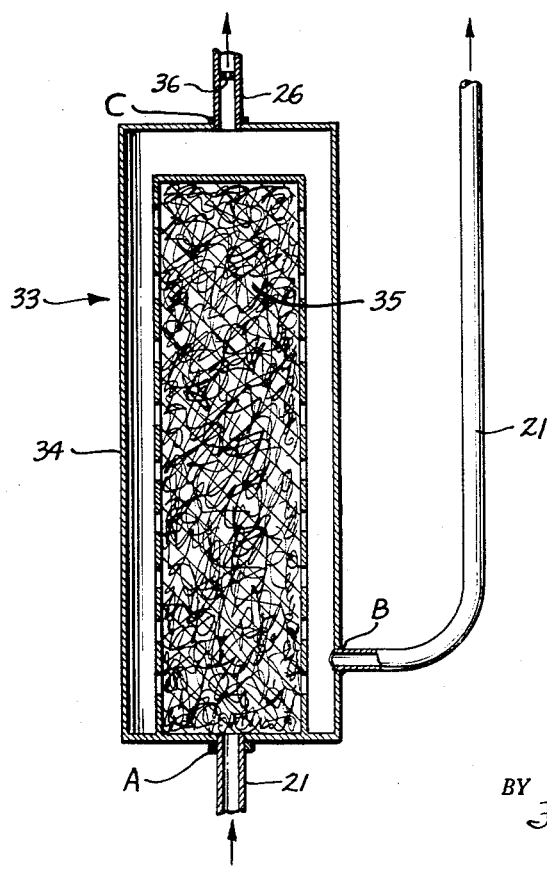
Fig. 5 is an enlarged central horizontal sectional view of the fuel accumulator shown in a cut-away portion of the helicopter blade of Fig. 1.

As shown in Fig. 5, such an accumulator comprises generally a cylindrical housing 34 equipped with a conventional filter medium 35 into which fuel from the pump is supplied through the primary fuel line 21. The accumulator is positioned so that upon rotation of the helicopter blade, fuel enters the inboard end of the cylinder 34 at point A shown in Fig. 5; and because of centrifugal forces generated by rotation of the blade 11 upon which the accumulator cylinder 34 is mounted (Fig. 1), the fuel passes through the filter medium 35 and fills the cylinder without flowing out through the primary fuel line 21, connected adjacent the inboard end of the cylinder at B, until after the cylinder is filled with fuel, whereupon primary fuel will flow through line 21.

As the auxiliary fuel line 26 is connected to the outboard end of the accumulator cylinder 34 at C it receives fuel first, and so the flow of secondary fuel to the trap 19 is initiated prior to the flow of primary fuel to the nozzle 18. Regulation of secondary fuel flow from the accumulator through the secondary fuel line 26 is accomplished in conventional fashion by means of a suitable restriction 36 in such fuel line 26.

Conversely, upon interruption of fuel flow from the pump, fuel accumulated in the cylinder 34 will discharge until the outlet B to the primary fuel line 21 is uncovered and fuel flow to the main nozzle ceases. But the flow of fuel through the secondary line 26 to the trap 19 will continue under the action of centrifugal force so long as there is any fuel in the cylinder 34, thereby providing a reserve fuel supply maintaining a lighted pilot jet in the trap 19 during short temporary periods when the main supply of fuel has been deliberately cut off, for example, in autorotation, or accidentally cut off; or when the fuel supply is for any reason inadequate to maintain full combustion in the engine. It is to be understood, however, that although the accumulator is desirable to take care of conditions when the main fuel supply is interrupted, such accumulator can be dispensed with as the pilot jet will remain lighted for ignition purposes as long as the primary fuel supply means is functioning.

By maintaining continuous combustion in the trap or enclosure 19, an auxiliary ignition or pilot jet is provided which aids in maintaining combustion in the main chamber 12 of the engine, thus avoiding or overcoming involuntary flame outs.

Additionally, as previously related, the particular accumulator means, if employed, will provide a pilot jet in the main combustion chamber 12 to facilitate restarting of the engine after periods of autorotation during which no fuel is pumped into the accumulator and hence none to the main spray nozzle 18. Should the accumulator not be employed or should fuel be completely exhausted from it, restarting will be done in the usual manner, in which case secondary air and fuel supplied to the trap in accordance with the invention will insure restarting.

The length of time that the pilot jet will burn after the primary fuel supply has been cut off is determined by the size of the accumulator cylinder 34 as regards the quantity of fuel that such cylinder will contain outboard of the outlet B to the primary fuel line 21 and by the size of the restrictor 36 in the secondary fuel line 26.

In operation, as the engine commences forward motion for starting, fuel is directed into the trap 19 for ignition by the spark plug 22. As the forward speed of the engine increases, a confined stream of secondary combustion supporting gas, in this case air, is supplied through the air intake line 24 into the trap 19 after first mixing with atomized secondary fuel introduced into the secondary air intake 24 from the secondary fuel line 26.

Forward movement of the engine introduces additional air and some fuel into the trap 19 through ports 31 located in its forward face 30. These ports are in registration with openings between the spokes 16 of the flame holder grid and receive an air-fuel mixture flowing from the forward opening 13 of the engine. Scoop members or fingers 32 extending forward of such ports 31 on the outboard side of the trap aid in directing air and fuel through the ports 31 into the trap 19. Air or air-fuel mixture flowing through such ports 31 is utilized in combustion in the trap 19 and at the same time furnishes a high velocity stream which aids in maintaining distribution of air and fuel for more efficient combustion therein.

In accordance with a feature of this invention, continuous combustion in the trap 19 is positively maintained by supplying the secondary or auxiliary air-fuel mixture to the trap 19 independently of the primary air-fuel mixture supplied to the main combustion chamber, thereby insuring efficient combustion conditions in the trap not entirely dependent upon flow of air through ports, such as 31, in the forward face 30 of the trap 19. Thus, the invention provides a continuous positive flow of air and fuel to the trap during operation of the engine and insures a continuously lighted pilot jet for maintaining combustion in the main chamber 12. The spark ignition means 22 may be used as required, but normally will be energized only to initiate combustion or starting.

Figure 4:
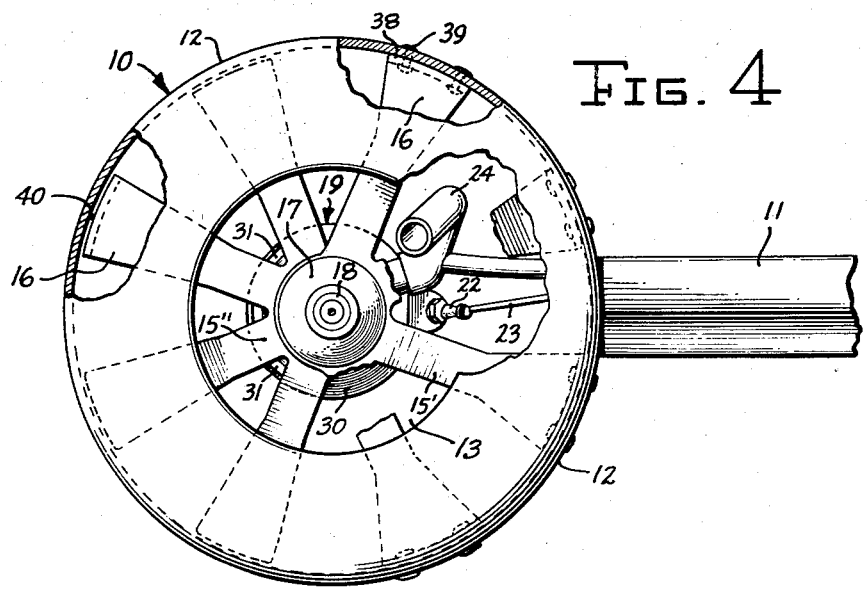
Fig. 4 is a front elevational view looking in the direction of arrows 4 in Fig. 2 with portions of the housing cut away to show construction more clearly and to illustrate the manner in which the flame holder grid, serving also as support for the primary fuel nozzle and trap, is mounted in the combustion chamber.

As best shown in Fig. 4, the trap 19 is mounted on the flame holder grid 15 by means of the two piece fuel hub assembly 17. In such mounting, the central piece or core 17' of the fuel hub assembly 17 is inserted through a central opening in the top or cover 30 of trap 19 with its flange 37 butting such cover. The core also passes through openings in separate overlapping halves, 15' and 15" making up the flame holder grid 15. The entire assembly is then clamped together by screwing the nut 17" of the fuel hub assembly 17 over the core 17'.

The inboard half 15' of the flame holder grid 15 has the ends 38 of its spokes 16 suitably secured, as by rivets 39, to the wall of the combustion chamber 12 thus securing the entire assembly of flame holder grid 15, trap 19 and fuel hub assembly 17 in place.

In order to prevent buckling or warping of the flame holder grid and housing due to thermal effects, the spokes of the outboard half 15" of the flame holder grid are not secured to the engine wall, but float free as indicated at 40 to thus provide a semi-floating grid. When the engine is in operation, thermal expansion, perhaps aided by centrifugal force as the engine rotates with the helicopter blade, will cause the floating spokes to contact the chamber wall thus providing support for the central assembly. Upon cooling, the spokes will contract and pull away from the wall; however, since they are not secured thereto, there will be no strain on either the wall or spokes.

Although in the embodiment shown, the flame holder grid comprises two separate halves for convenience of assembly, it is to be understood that a single piece grid as well as a grid of more than two sections can be employed. In such cases portions of the grid will be secured to the wall of the combustion chamber and the remaining portions left unattached. Also, insofar as the described secondary air-fuel mixture is concerned, all the spokes of the grid can be secured to the chamber wall as in the aforementioned application. The portions of the grid which are to be attached to the housing and those which are to be free to float will depend upon the nature of the housing and the expected strains. However, for a circular housing and two piece grid such as described herein, substantially one-half of the grid will be secured and the other one-half left unattached. In this connection, it should be noted that substantially complete portions of the grid should be attached or unattached rather than discontinuous portions. Thus, in the embodiment shown, all spokes of the inboard half 15' of the grid 15 are attached while all spokes of the outboard half 15" are unattached.

It is to be understood that the shape of the particular embodiment of the trap illustrated herein may vary so long as it has an opening of reduced cross-sectional area to throttle the flow of gases and provide a relatively static mass. Moreover, the invention will work also on traps having perforations to aid in flame escape.

The invention may be utilized in a standard turbine jet engine in which the trap 19 may be used as a pilot jet auxiliary ignition means for use in cases of flame-out;

and the combustion supporting gas may be pressured pure oxygen for use at high altitudes. In such a case, the trap may be positioned in the primary combustion chamber of the engine with the primary fuel supply being distributed adjacent the discharge nozzle of the trap, thereby taking full advantage of the auxiliary igniter flame.

I claim:

1. The combustion with a blade of a helicopter, of a jet engine comprising a chamber supported by said blade and having primary fuel supply means, secondary fuel supply means including a pilot burner, and ignition means for said pilot burner, a primary fuel line carried by said blade and connected to said primary fuel supply means, a secondary fuel line carried by said blade and connected to said secondary fuel supply means, and means including a chamber carried by said blade and interconnecting said fuel lines providing a reserve supply of fuel for said secondary line to maintain burning of said pilot during temporary periods of cessation of flow of fuel in said primary line.

2. The combination with a blade of a helicopter, of a jet engine comprising a chamber supported by said blade and having primary fuel supply means, secondary fuel supply means including a pilot burner, and ignition means for said pilot burner, a primary fuel line carried by said blade and connected to said primary fuel supply means, a secondary fuel line carried by said blade and connected to said secondary fuel supply means, and means providing a reserve supply of fuel for said secondary line to maintain burning of said pilot during temporary periods of cessation of flow of fuel in said primary line comprising a fuel accumulator chamber carried by said blade, said chamber being connected adjacent its outboard end to said secondary fuel line and adjacent its inboard end to said primary fuel line.

3. The combination with a blade of a helicopter comprising a tubular chamber supported by said blade and extending chordwise thereof, said chamber having a front inlet opening upstream, a rear discharge opening downstream, a flame holder grid comprising a plurality of radially extending spokes between said openings connected to a substantially central imperforate structure providing a shield against direct blasts of rearwardly flowing air, primary fuel supply means in said chamber in front of said grid, a primary fuel line connected to said primary fuel supply means, an enclosure adjacent the rear of said grid having a peripheral wall about said shield structure and providing a fluid receiving trap, the upstream end of said peripheral wall being adjacent the inner ends of said spokes, said shield structure having an open portion only along the outboard side thereof to provide unshielded open space between spokes at said outboard side for flow of said fluid into said enclosure, the spokes of said grid at said outboard side being unsecured to said chamber whereby they are free to expand and contract relative to said chamber with changes in temperature, the spokes at the inboard side of said grid being secured to said chamber, said enclosure having an open portion for egress of ignited fluid into said engine chamber, secondary fuel supply means in said enclosure at the shielded inboard side thereof and providing a pilot burner, a secondary fuel line connected to said secondary fuel supply means and extending into said enclosure, ignition means in said enclosure at the shielded inboard side thereof and adjacent said pilot burner, and an air intake tube in said chamber connected to said secondary line and extending toward said front inlet opening of said chamber to conduct combustion air for said pilot.

4. The combination with a blade of a helicopter comprising a tubular chamber supported by said blade and extending chordwise thereof, said chamber having a front inlet opening upstream, a rear discharge opening downstream, a flame holder grid comprising a plurality of radially extending spokes between said openings connected to a substantially central imperforate structure providing a shield against direct blasts of rearwardly flowing air, primary fuel supply means in said chamber in front of said grid, a primary fuel line connected to said primary fuel supply means, an enclosure adjacent the rear of said grid having a peripheral wall about said shield structure and providing a fluid receiving trap, the upstream end of said peripheral wall being adjacent the inner ends of said spokes, said shield structure having an open portion only along the outboard side thereof to provide unshielded open space between spokes at said outboard side for flow of said fluid into said enclosure, the spokes of said grid at said outboard side being unsecured to said chamber whereby they are free to expand and contract relative to said chamber with changes in temperature, the spokes at the inboard side of said grid being secured to said chamber, said enclosure having an open portion for egress of ignited fluid into said engine chamber, secondary fuel supply means in said enclosure at the shielded inboard side thereof and providing a pilot burner, a secondary fuel line connected to said secondary fuel supply means and extending into said enclosure, ignition means in said enclsoure at the shielded inboard side thereof and adjacent said pilot burner, an air intake tube in said chamber connected to said secondary line and extending toward said front inlet opening of said chamber to conduct combustion air for said pilot, and means including a chamber carried by said blade and interconnecting said fuel lines providing a reserve supply of fuel for said secondary line to maintain burning of said pilot during temporary periods of cessation of flow of fuel in said primary line.

5. In a ram jet engine constrained to move in a rotary path about an axis and comprising a tubular combustion chamber having inboard and outboard sides relative to said axis, a front inlet opening, a rear discharge opening and primary fuel supply means, the combination therewith of a pilot burner assembly comprising an enclosure mounted within said combustion chamber, the front portion of said enclosure being substantially imperforate and forming a shield against direct blasts of fluid flowing through said combustion chamber, ports through said shield to permit a limited flow of fluid into said enclosure, the location of said ports being restricted to the outboard side of said shield, secondary fuel supply means for delivering fuel into said enclosure at the shielded inboard side thereof, ignition means in said enclosure at said shielded inboard side, and an opening in said enclosure rearward of said shield for egress of ignited fuel into said combustion chamber.

6. The combination with a blade of a helicopter comprising a tubular chamber supported by said blade and extending chordwise thereof, said chamber having a front inlet opening upstream, a rear discharge opening, a flame holder grid comprising a plurality of radially extending spokes between said openings connected to a substantially central imperforate structure providing a shield against direct blasts of rearwardly blowing air, primary fuel supply means in said chamber in front of said grid, a primary fuel line connected to said primary fuel supply means, an enclosure adjacent the rear of said grid having a peripheral wall about said shield structure and providing a fluid receiving trap, the upstream end of said peripheral wall being adjacent the inner end of said spokes, said shield structure having an open portion only along the outboard side thereof to provide unshielded open space between spokes at said outboard side for flow of said fluid into said enclosure, said enclosure having an open portion for egress of ignited fluid into said engine chamber, secondary fuel supply means in said enclosure at the shielded inboard side thereof and providing a pilot burner, a secondary fuel line connected to said secondary fuel supply means and extending into said enclosure, ignition means in said enclosure at the shielded inboard side thereof and adjacent said pilot, and an air intake tube in said chamber connected to said secondary line and extending toward said front inlet opening of said chamber to conduct combustion air for said pilot.

References Cited in the file of this patent

UNITED STATES PATENTS

| | | |
|---|---|---|
| 2,592,110 | Berggren | Apr. 8, 1952 |
| 2,625,788 | Neikirk et al. | Jan. 20, 1953 |
| 2,635,424 | Szczeniowski | Apr. 21, 1953 |
| 2,705,400 | Allen | Apr. 5, 1955 |
| 2,729,059 | Foure | Jan. 3, 1956 |
| 2,729,283 | Mathey | Jan. 3, 1956 |
| 2,734,341 | Lovesey | Feb. 14, 1956 |
| 2,740,482 | Hiller et al. | Apr. 3, 1956 |
| 2,768,498 | Karcher | Oct. 30, 1956 |
| 2,775,867 | Collins | Jan. 1, 1957 |
| 2,780,062 | Barrett et al. | Feb. 5, 1957 |
| 2,793,495 | Karcher | May 28, 1957 |

FOREIGN PATENTS

| | | |
|---|---|---|
| 723,830 | Great Britain | Feb. 9, 1955 |

UNITED STATES PATENT OFFICE
CERTIFICATE OF CORRECTION

Patent No. 2,950,763                                             August 30, 1960

Edward L. Bennett

It is hereby certified that error appears in the printed specification of the above numbered patent requiring correction and that the said Letters Patent should read as corrected below.

Column 4, line 4, for "mixtures" read -- mixture --; column 7, line 8, for "combustion" read -- combination --; line 65, strike out "burner"; column 8, line 24, strike out "burner".

Signed and sealed this 4th day of April 1961.

(SEAL)
Attest:   ERNEST W. SWIDER

Attesting Officer                                         ARTHUR W. CROCKER
                                                                     Acting Commissioner of Patents